United States Patent
Momoi

(10) Patent No.: US 11,275,270 B2
(45) Date of Patent: Mar. 15, 2022

(54) SURFACE LIGHT SOURCE DEVICE AND DISPLAY DEVICE

(71) Applicant: Enplas Corporation, Saitama (JP)

(72) Inventor: Takuro Momoi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 17/132,563

(22) Filed: Dec. 23, 2020

(65) Prior Publication Data

US 2021/0200037 A1 Jul. 1, 2021

(30) Foreign Application Priority Data

Dec. 27, 2019 (JP) .............................. JP2019-238713

(51) Int. Cl.
*G02F 1/00* (2006.01)
*G02F 1/13357* (2006.01)
*G02F 1/1335* (2006.01)

(52) U.S. Cl.
CPC .. *G02F 1/133611* (2013.01); *G02F 1/133603* (2013.01); *G02F 1/133607* (2021.01)

(58) Field of Classification Search
CPC ........ G02F 1/133603; G02F 1/07; G02F 1/11; G02F 1/13
See application file for complete search history.

(56) References Cited

U.S. PATENT DOCUMENTS

| | | | | |
|---|---|---|---|---|
| 2009/0268430 A1* | 10/2009 | Suzuki | .............. | G02F 1/133611 362/97.1 |
| 2012/0044668 A1* | 2/2012 | Takeuchi | .......... | G02F 1/133608 362/97.1 |
| 2013/0093963 A1* | 4/2013 | Kasai | ................ | G02F 1/133603 348/739 |
| 2020/0041836 A1* | 2/2020 | Imada | ..................... | H01L 33/58 |
| 2020/0271994 A1* | 8/2020 | Zha | ................... | G02F 1/133605 |
| 2021/0103187 A1* | 4/2021 | Woodgate | ......... | G02F 1/133609 |

FOREIGN PATENT DOCUMENTS

JP 2010278426 A 12/2010

\* cited by examiner

*Primary Examiner* — Gerald J Sufleta, II
(74) *Attorney, Agent, or Firm* — Brundidge & Stanger, P.C.

(57) ABSTRACT

A surface light source device includes a housing; one or more substrates disposed in the housing, each of the one or more substrates having a substantially rectangular shape; a plurality of light-emitting devices disposed on the one or more substrates; and a light diffusion plate disposed over the plurality of light-emitting devices. Each of the light-emitting devices includes a light-emitting element and a light flux controlling member. The plurality of light-emitting devices is disposed on two or more first virtual lines that are parallel to each other and are parallel to one side of each of the one or more substrates. A light-emitting surface of the light-emitting element has a substantially rectangular shape in plan view. Of angles between each side of the light-emitting surface of the light-emitting element and each of the two or more first virtual lines, a smallest angle is 25 degrees to 45 degrees.

8 Claims, 7 Drawing Sheets

SURFACE LIGHT SOURCE DEVICE AND DISPLAY DEVICE

CROSS REFERENCE TO RELATED APPLICATIONS

This application is entitled to and claims the benefit of Japanese Patent Application No. 2019-238713, filed on Dec. 27, 2019, the disclosure of which including the specification, drawings and abstract is incorporated herein by reference in its entirety.

TECHNICAL FIELD

The present invention relates to a surface light source device and a display device including the surface light source device.

BACKGROUND ART

Some transmissive image display devices such as liquid crystal display apparatuses use a direct surface light source device as a backlight. In recent years, direct surface light source devices including a plurality of light-emitting devices as a light source have been used.

FIG. 1A illustrates an arrangement of light-emitting devices 20 in known surface light source device 10 disclosed in PTL 1. As illustrated in FIG. 1A, a plurality of strip substrates 21 on which a plurality of light-emitting devices 20 is attached is disposed parallel to each other on substantially rectangular supporting body 40. In this manner, in surface light source device 10 disclosed in PTL 1, the plurality of light-emitting devices 20 is disposed in a grid pattern.

CITATION LIST

Patent Literature

PTL 1
Japanese Patent Application Laid-Open No. 2010-278426

SUMMARY OF INVENTION

Technical Problem

FIG. 1B illustrates an arrangement of light-emitting surfaces 50 of the light-emitting elements in light-emitting devices 20 illustrated in FIG. 1A. As illustrated in FIG. 1B, light-emitting surface 50 of the light-emitting element has a substantially rectangular shape, and the side of light-emitting surface 50 of the light-emitting element is disposed in parallel to the longitudinal direction or the short direction of substrate 21.

FIG. 1C illustrates an image of a luminance distribution on the light diffusion plate with the light-emitting element disposed in the above-mentioned manner. As illustrated in FIG. 1C, light from the light-emitting element tends to be spread in the direction perpendicular to each side of light-emitting surface 50, but does not tend to be spread in the diagonal direction of light-emitting surface 50. As a result, in the case where light-emitting devices 20 are disposed in a grid pattern in known surface light source device 10, light does not spread in the diagonal direction of a grid, and dark point 60 may be generated on the light diffusion plate and luminance unevenness may be generated, for example (see FIG. 1A).

To solve the above-mentioned problems, an object of the present invention is to provide a surface light source device including a plurality of light-emitting devices that can suppress generation of luminance unevenness due to orientations of light-emitting surfaces of light-emitting elements, and to provide a display device including the surface light source device.

Solution to Problem

A surface light source device of an embodiment of the present invention includes a housing; one or more substrates disposed in the housing, each of the one or more substrates having a substantially rectangular shape; a plurality of light-emitting devices disposed on the one or more substrates; and a light diffusion plate disposed over the plurality of light-emitting devices, wherein each of the plurality of light-emitting devices includes a light-emitting element and a light flux controlling member, wherein the plurality of light-emitting devices is disposed on two or more first virtual lines that are parallel to each other and are parallel to one side of each of the one or more substrates, wherein a light-emitting surface of the light-emitting element has a substantially rectangular shape in plan view, and wherein of angles between each side of the light-emitting surface of the light-emitting element and each of the two or more first virtual lines, a smallest angle is 25 degrees to 45 degrees.

The embodiment of the present invention A surface light source device includes a housing; one or more substrates disposed in the housing; a plurality of light-emitting devices disposed on the one or more substrates; and a light diffusion plate disposed over the plurality of light-emitting devices, wherein each of the plurality of light-emitting devices includes a light-emitting element and a light flux controlling member, wherein each of the plurality of light-emitting devices is disposed on each of the one or more substrates at a location on an intersection of a quadrangle defined by two or more first virtual lines that are parallel to each other and are set in the housing and two or more second virtual lines that are parallel to each other and intersect each of the two or more first virtual lines, wherein a light-emitting surface of the light-emitting element has a substantially rectangular shape in plan view, and wherein an angle between each side of the light-emitting surface and a diagonal line of the quadrangle is 70 degrees to 110 degrees, or an angle between a side of the light-emitting surface facing a direction of the diagonal and each of the two or more first virtual lines is 25 degrees to 65 degrees.

A display device of an embodiment of the present invention includes the above-mentioned surface light source device, and a display member configured to be irradiated with light emitted from the surface light source device.

Advantageous Effects of Invention

According to the present invention, it is possible to suppress generation of luminance unevenness due to the orientations of light-emitting surfaces of light-emitting elements in a surface light source device including a plurality of light-emitting devices.

DESCRIPTION OF EMBODIMENTS

An embodiment of the present invention is elaborated below with reference to the accompanying drawings. In the following description, as a typical example of the surface light source device of the embodiment of the present invention, surface light source device 100 suitable for a backlight of a liquid crystal display apparatus and the like is described. When combined with a display member (irradiation target member) 102 (e.g., a liquid crystal panel) configured to be irradiated with light from surface light source device 100, surface light source device 100 can be used as display device 100'.

Configurations of Surface Light Source Device and Light-Emitting Device

Figure 1A:
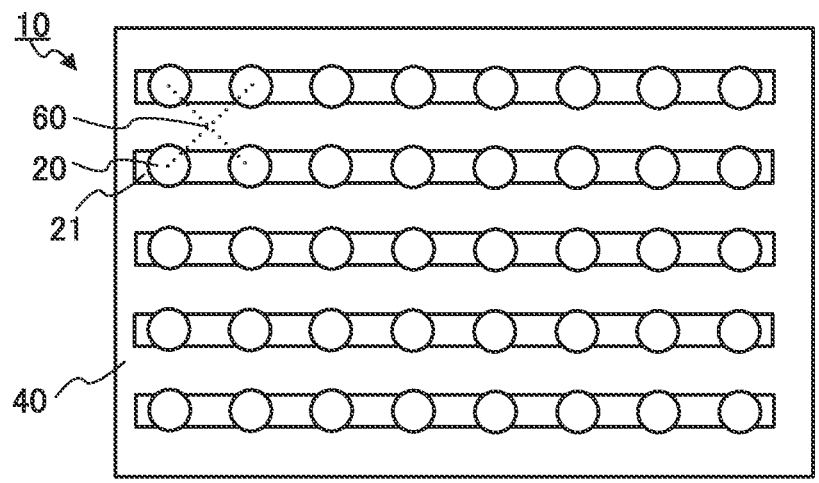
FIG. 1A illustrates an arrangement of light-emitting devices in a known surface light source device.
Figure 1B:
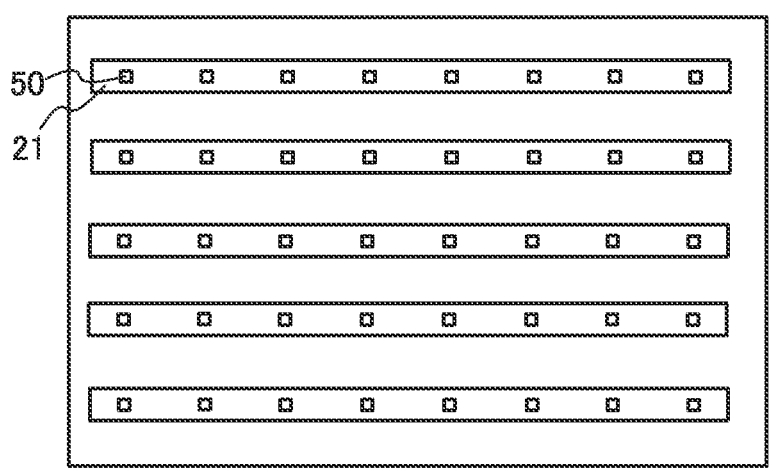
FIG. 1B illustrates an arrangement of light-emitting surfaces of light-emitting elements in light-emitting devices illustrated in FIG. 1A.
Figure 1C:
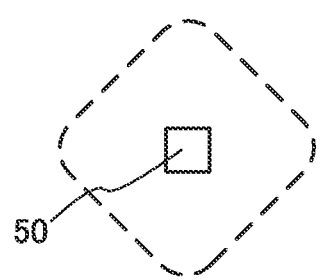
FIG. 1C illustrates an image of a luminance distribution of light-emitting surfaces of light-emitting elements.
Figure 2A:
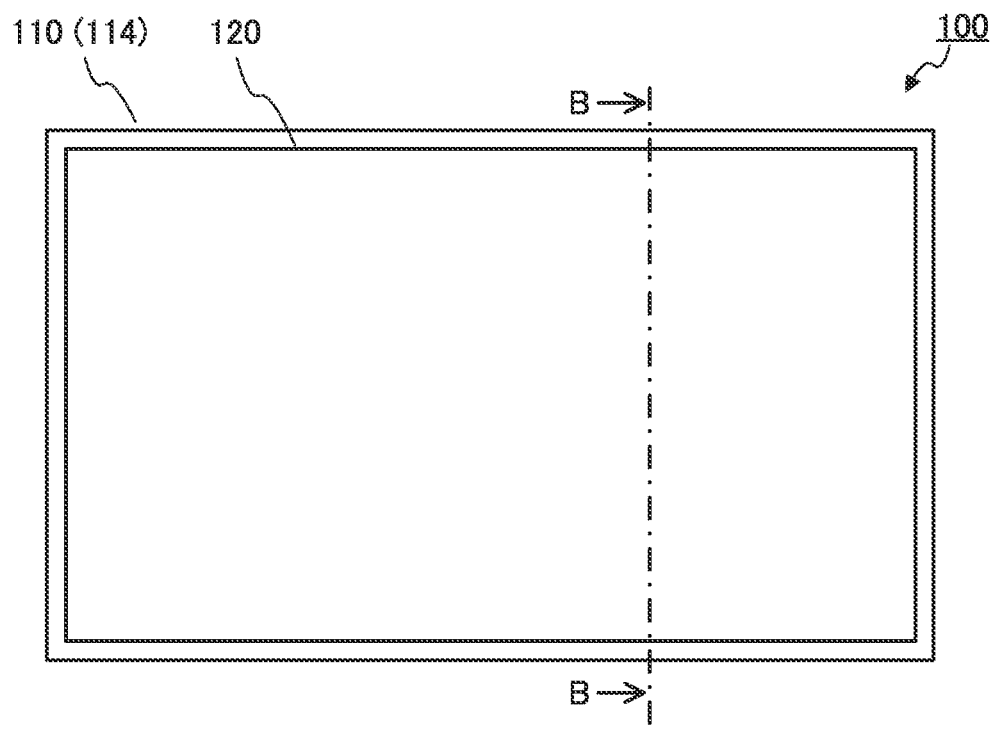
FIGS. 2A and 2B illustrate a configuration of a surface light source device according to an embodiment.
Figure 2B:
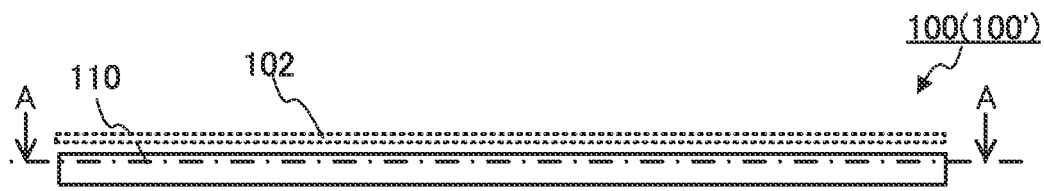
Figure 3A:
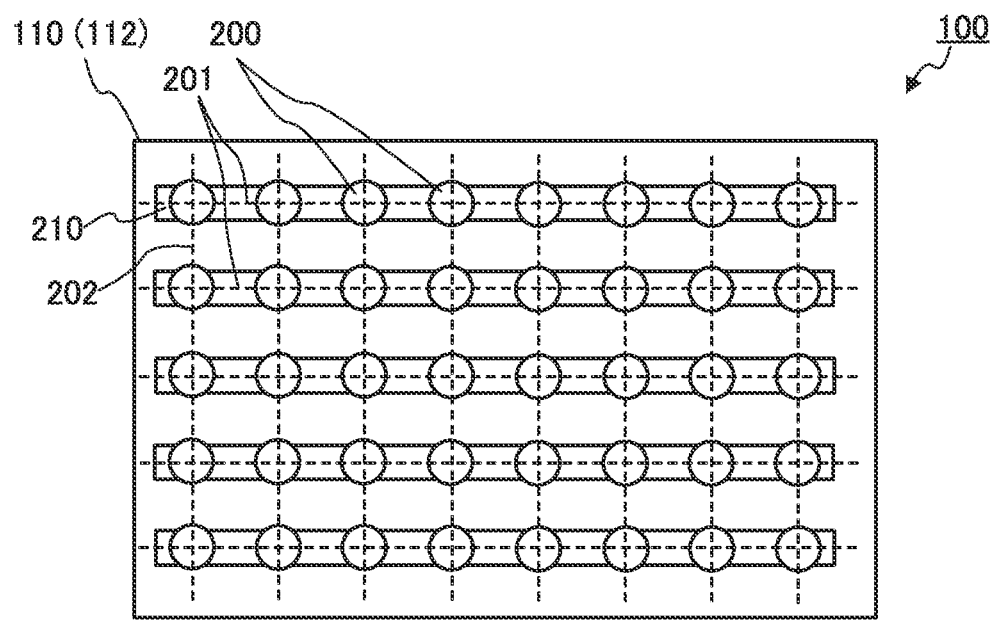
FIGS. 3A and 3B are sectional views illustrating a configuration of the surface light source device according to the embodiment.
Figure 3B:
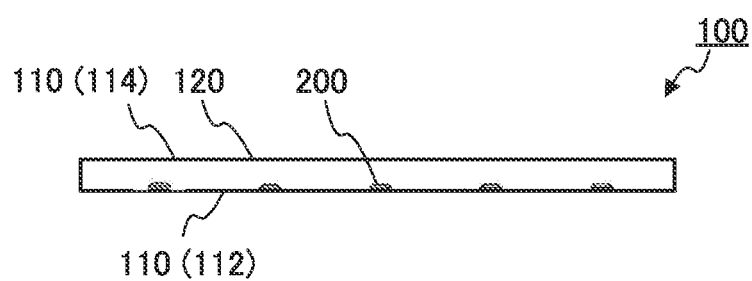
Figure 4:
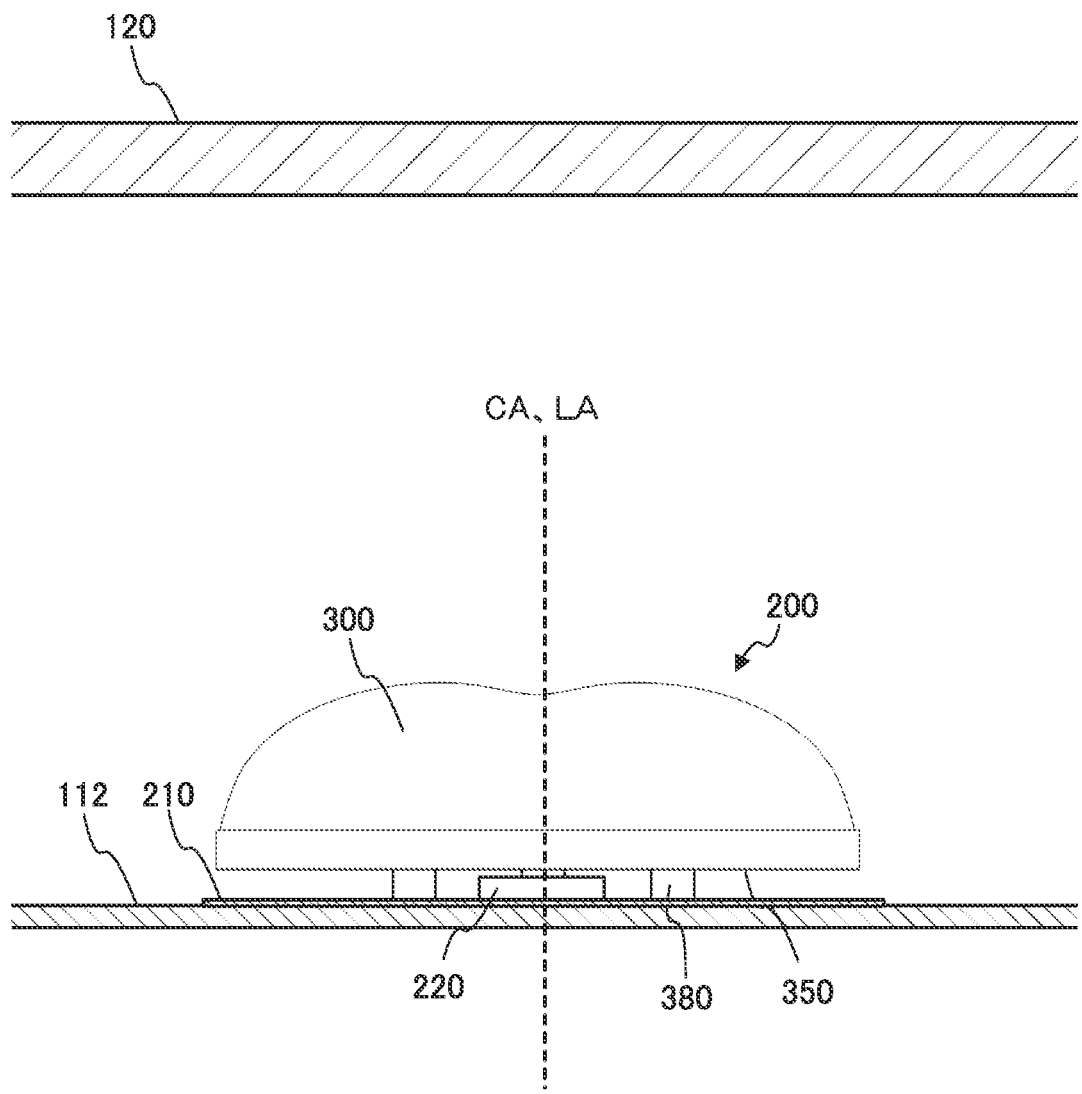
FIG. 4 is a partially enlarged sectional view of FIG. 3B.

FIGS. 2A to 4 illustrate a configuration of surface light source device 100 of the embodiment of the present invention. FIG. 2A is a plan view and FIG. 2B is a front view. FIG. 3A is a sectional view taken along line A-A of FIG. 2B, and FIG. 3B is a sectional view taken along line B-B of FIG. 2A. FIG. 4 is a partially enlarged sectional view of FIG. 3B.

As illustrated in FIGS. 2A to 4, surface light source device 100 according to the present embodiment includes housing 110, a plurality of light-emitting devices 200 and light diffusion plate 120. The plurality of light-emitting devices 200 is disposed in a grid pattern on bottom plate 112 of housing 110, for example. The inner surface of bottom plate 112 functions as a diffusive reflection surface. In addition, a rectangular opening is provided in top plate 114 of housing 110. Light diffusion plate 120 is disposed to close this opening, and functions as a light-emitting surface. The size of the light-emitting surface is not limited and is approximately 400 mm×approximately 700 mm, for example.

In surface light source device 100 according to the present embodiment, the plurality of light-emitting devices 200 are disposed side by side in a grid pattern as illustrated in FIG. 3A, for example, but this configuration is not limitative. It is preferable that the plurality of light-emitting devices 200 be disposed on two or more first virtual lines 201 parallel to each other and parallel to one side of substrate 210.

To be more specific, preferably, each of the plurality of light-emitting devices 200 is disposed on substrate 210 at a location on an intersection of a quadrangle defined by two or more first virtual lines 201 parallel to each other and are set in housing 110 and two or more second virtual lines 202 that are parallel to each other and intersect the first virtual line 201. More specifically, preferably, each of the plurality of light-emitting devices 200 is disposed such at a location on an intersection of a quadrangle defined by a plurality of first virtual lines 201 that extend in the longitudinal direction of substrate 210 and are parallel to each other in housing 110 and a plurality of second straight lines 202 that are orthogonal to first virtual line 201 and are parallel to each other.

As illustrated in FIG. 4, each of the plurality of light-emitting devices 200 is fixed on substrate 210. One or more substrates 210 are fixed to respective predetermined positions on bottom plate 112 of housing 110. In the case where a single substrate 210 is used, it is preferable to use a large substrate 210 in order to dispose the plurality of light-emitting devices 200. Each of the plurality of light-emitting devices 200 includes light-emitting element 220 and light flux controlling member 300. Note that substrate 210 has a substantially rectangular shape in plan view (FIG. 3A).

Light-emitting element 220 is a light source of surface light source device 100 and is mounted on substrate 210. Light-emitting element 220 is a light-emitting diode (LED) such as a white light-emitting diode, for example.

Light flux controlling member 300 is a lens configured to control the distribution of light emitted from light-emitting element 220, and includes leg part 380. Light flux controlling member 300 is fixed on substrate 210. Examples of the lens include, but not limited to, a diffusion lens and a total reflection lens. Light flux controlling member 300 is disposed over light-emitting element 220 in such a manner that central axis CA of light flux controlling member 300 coincides with light axis LA of light-emitting element 220. The "light axis LA of light-emitting element" means a central light beam of a stereoscopic emission light flux from light-emitting element 220. A gap configured to dissipate the heat of light-emitting element 220 to the outside is formed between substrate 210 on which light-emitting element 220 is mounted and rear surface 350 of light flux controlling member 300.

Light flux controlling member 300 is formed by integral molding. The material of light flux controlling member 300 is not limited as long as light of a desired wavelength can pass therethrough. Examples of the material of light flux controlling member 300 include optically transparent resins such as polymethylmethacrylate (PMMA), polycarbonate (PC), epoxy resin (EP), and silicone, and glass.

A main feature of surface light source device 100 according to the present embodiment is the arrangement of the light-emitting surface of light-emitting element 220. In view of this, the arrangement of the light-emitting surface of light-emitting element 220 will be described in detail later.

Light diffusion plate 120 is a plate-shaped member having a light diffusibility, and transmits light emitted from light-emitting device 200 while diffusing the light. Normally, light diffusion plate 120 has substantially the same size as the irradiation target member such as a liquid crystal panel. For example, light diffusion plate 120 is formed with an optically transparent resin such as polymethylmethacrylate (PMMA), polycarbonate (PC), polystyrene (PS), and styrene-methyl methacrylate copolymerization resin (MS). To provide a light diffusibility, minute irregularity is formed in the surface of light diffusion plate 120, or light diffusers such as beads are dispersed inside light diffusion plate 120.

In surface light source device 100 according to the present embodiment, light emitted from each light-emitting element 220 is spread by light flux controlling member 300 to illuminate a wide range of light diffusion plate 120. Light emitted from each light flux controlling member 300 is further diffused by light diffusion plate 120. Thus, surface light source device 100 according to the present embodiment can uniformly illuminate a planar irradiation target member (e.g., a liquid crystal panel).

Arrangement of Light-Emitting Surface of Light-Emitting Element

Figure 5A:
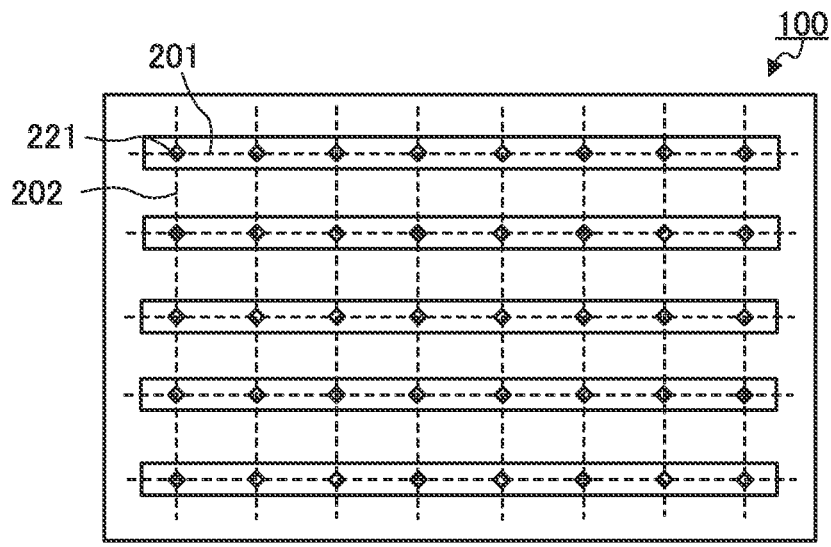
FIG. 5A illustrates an arrangement of light-emitting surfaces of light-emitting elements in the surface light source device according to the embodiment.
Figure 5B:
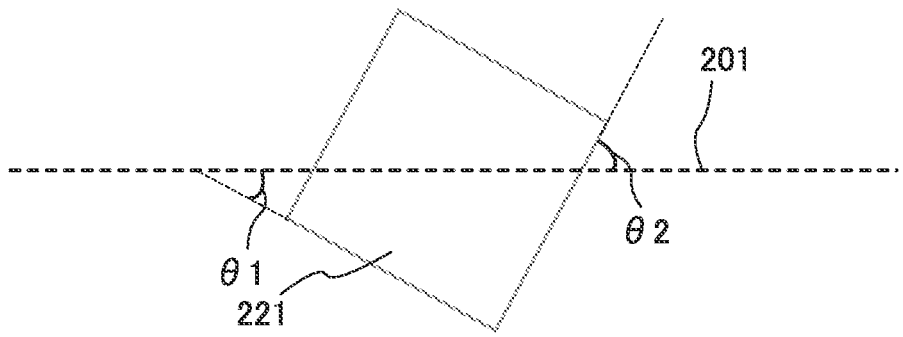
FIGS. 5B and 5C illustrate details of the arrangement of the light-emitting surfaces.
Figure 5C:
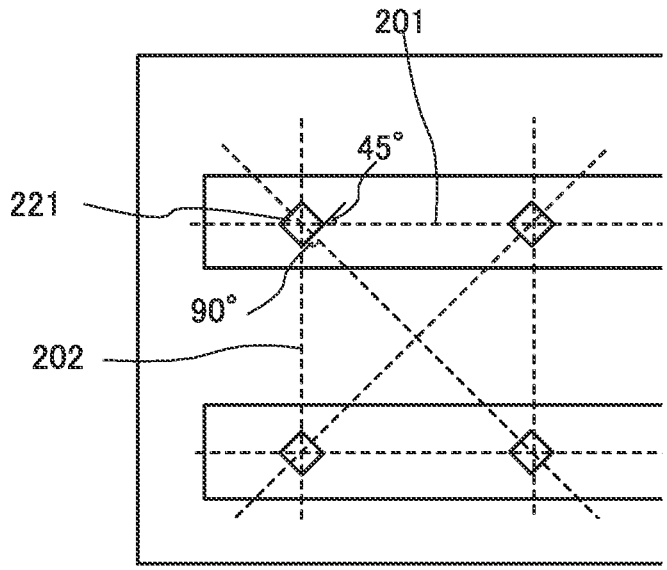

FIG. 5A illustrates an arrangement of light-emitting surface 221 of a light-emitting element in surface light source device 100 according to the present embodiment. FIGS. 5B and 5C illustrate a placement angle of light-emitting surface 221 of a light-emitting element.

As described above, in surface light source device 100 according to the present embodiment, light-emitting devices 200 are disposed on two or more first virtual lines 201 parallel to each other and parallel to one side of substrate 210, for example. Alternatively, light-emitting devices 200 are disposed on substrate 210 at locations on intersections of quadrangles defined by two or more first virtual lines 201 that are parallel to each other and are set in housing 110 and two or more second virtual lines 202 that are parallel to each other and intersect first virtual line 201. In FIG. 3A, light-emitting devices 200 are disposed at locations on intersections of quadrangles defined by first virtual lines 201 that are parallel to each other in housing 110 and extend in the longitudinal direction of substrate 210 and a plurality of second virtual lines 202 that are parallel to each other and are orthogonal to first virtual lines 201. As a result, as illustrated in FIG. 5A, light-emitting surfaces 221 of the light-emitting elements are also disposed at locations on intersections of quadrangles.

The quadrangles where light-emitting devices 200 are disposed are not limited as long as the shapes are substantially rectangular. In the present embodiment, the quadrangles where light-emitting devices 200 are disposed are substantially squares as illustrated in FIG. 5A. In the shape of each quadrangle, the ratio of the length in the first virtual line 201 direction to the length in the second virtual line 202 direction is preferably 1:0.5 to 1.5, more preferably 1:0.8 to 1.2, still more preferably 1:1 (substantially square).

The shape of light-emitting surface 221 of the light-emitting element is not limited as long as it is substantially rectangular in plan view. In the present embodiment, as illustrated in FIGS. 5A, 5B and 5C, light-emitting surface 221 of the light-emitting element has a substantially square shape in plan view. In the substantially rectangular shape of light-emitting surface 221, the ratio of two sides is preferably 1:0.5 to 1.5, more preferably 1:0.8 to 1.2, still more preferably 1:1 (substantially square), for example.

When two or more substrates are used, the aspect ratio of the arrangement pitch of light-emitting devices 200 is preferably 1:2 to 2:1. The ratio is more preferably 3:4 to 4:3, still more preferably 4:5 to 5:4.

FIG. 5B illustrates angles between the sides of light-emitting surface 221 of the light-emitting element and first virtual line 201. Of the two angles θ1 and θ2 illustrated in FIG. 5B, θ1 is the smallest angle between each side of light-emitting surface 221 of the light-emitting element and first virtual line 201. Note that if θ1 is greater than 45 degrees, then θ2 is the smallest angle. Here, from a view point of suppressing the luminance unevenness, the smallest angle is preferably 25 degrees to 45 degrees, more preferably 35 degrees to 45 degrees, still more preferably 40 degrees to 45 degrees, yet more preferably 45 degrees.

FIG. 5C illustrates an angle between each side of light-emitting surface 221 of the light-emitting element and a diagonal line of a quadrangle defined by two or more first virtual lines 201 that are parallel to each other and two or more second virtual lines 202 that are parallel to each other and intersect first virtual lines 201, and an angle between the first virtual line and a side, of light-emitting surface 221 of the light-emitting element, facing the direction of the diagonal line of the quadrangle.

From a view point of suppressing the luminance unevenness, an angle between each side of flight-emitting surface 221 of the light-emitting element and the diagonal line of the quadrangle is preferably 70 degrees to 110 degrees, more preferably 80 degrees to 100 degrees, still more preferably 85 degrees to 95 degrees. In the present embodiment, as illustrated in FIG. 5C, the angle between each side of flight-emitting surface 221 of the light-emitting element and the diagonal line of the quadrangle is 90 degrees.

In addition, from a view point of suppressing the luminance unevenness, the angle between first virtual line 201 and the side of light-emitting surface 221 of the light-emitting element that faces the direction of the diagonal line of the quadrangle is preferably 25 degrees to 65 degrees, more preferably 35 degrees to 55 degrees, still more preferably 40 degrees to 50 degrees. In the present embodiment, as illustrated in FIG. 5C, the angle between first virtual line 201 and the side of light-emitting surface 221 of the light-emitting element that faces the direction of the diagonal line of the quadrangle is 45 degrees.

Arrangement of Leg Parts

Figure 6A:
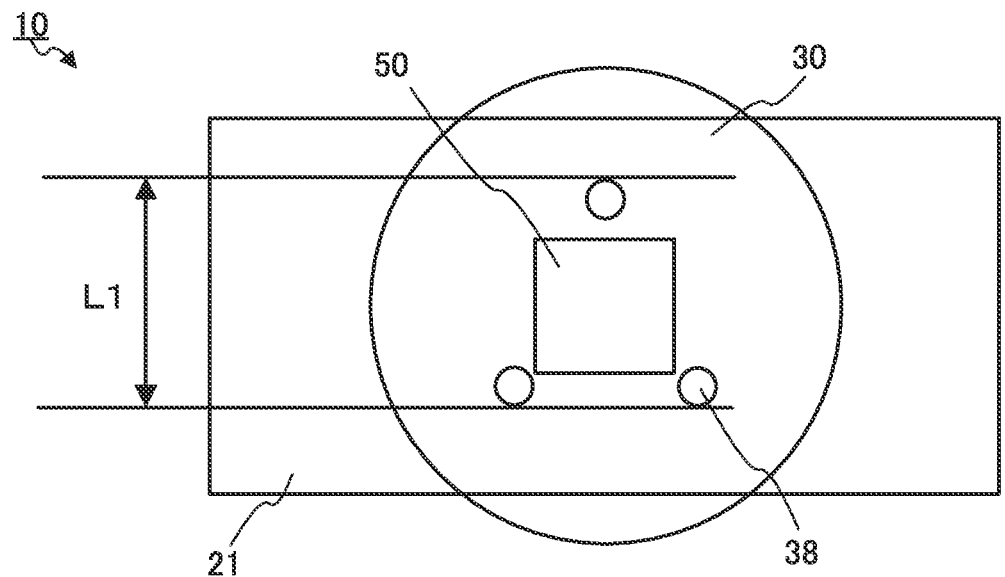
FIG. 6A illustrates an arrangement of leg parts in plan view of a light flux controlling member in a known surface light source device.
Figure 6B:
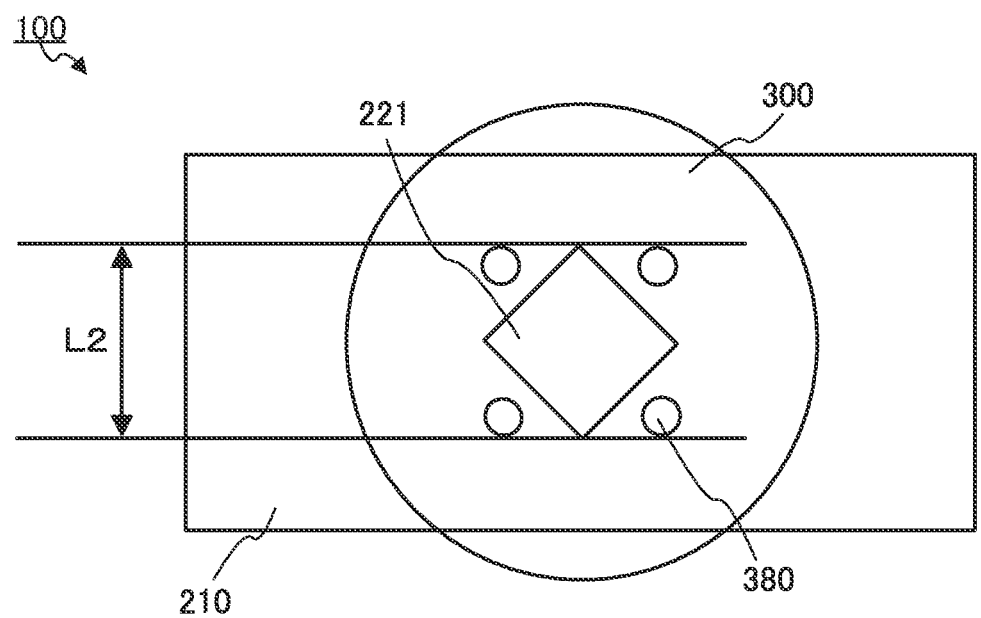
FIG. 6B illustrates an arrangement of leg parts in plan view of a light flux controlling member in the surface light source device according to the embodiment.

FIG. 6A illustrates an arrangement of leg parts 38 in plan view of light flux controlling member 30 of known surface light source device 10, and FIG. 6B illustrates an arrangement of leg parts 380 in plan view of light flux controlling member 300 of surface light source device 100 of the embodiment of the present invention.

As illustrated in FIG. 6A, each side of light-emitting surface 50 of the light-emitting element of known surface light source device 10 is parallel to the longitudinal direction or the short direction of substrate 21. Further, one leg part 38 of light flux controlling member 30 is disposed opposite to a side, parallel to the longitudinal direction of substrate 21, of light-emitting surface 50 of the light-emitting element, and two leg parts 38 of light flux controlling member 30 are disposed opposite to two corners light-emitting surface 50. As such, in known surface light source device 10, leg parts 38 may possibly make contact with light-emitting surface 50 of the light-emitting element when light flux controlling member 30 is bonded to substrate 21. In addition, since leg part 38 is disposed relatively outside in light flux controlling member 30 to avoid the contact between the light-emitting element and leg part 38, length L1 of substrate 21 in the short axial direction in the region where leg part 38 is disposed is relatively large. When leg part 38 is disposed outside light flux controlling member 30 in this manner, the quantity of light that travels to a part immediately above light flux controlling member 30 increases.

In addition, since leg part 38 is disposed at a portion where the thickness of light flux controlling member 30 is small, light flux controlling member 30 becomes fragile when force is applied.

In contrast, as illustrated in FIG. 6B, each side of flight-emitting surface 221 of the light-emitting element of surface light source device 100 according to the present embodiment is disposed obliquely to the longitudinal direction of substrate 210. Four leg parts 380 of light flux controlling member 300 are disposed opposite to respective four sides of light-emitting surface 221 of the light-emitting element. In this manner, according to the present embodiment, when bonding light flux controlling member 300 to substrate 210, the risk of the contact of leg part 380 with light-emitting surface 221 of the light-emitting element is low. In addition, since leg part 380 can be disposed at a position closer to the center side of light flux controlling member 300, length L2 of substrate 210 in the short axis direction in the region where leg part 380 is disposed can be relatively reduced. In this manner, the width of substrate 210 where light flux controlling member 300 is disposed can be reduced. In addition, since leg part 380 is disposed at a portion where the thickness of light flux controlling member 300 is large, light flux controlling member 300 does not become fragile when force is applied.

Orientational Characteristics

Figure 7A:
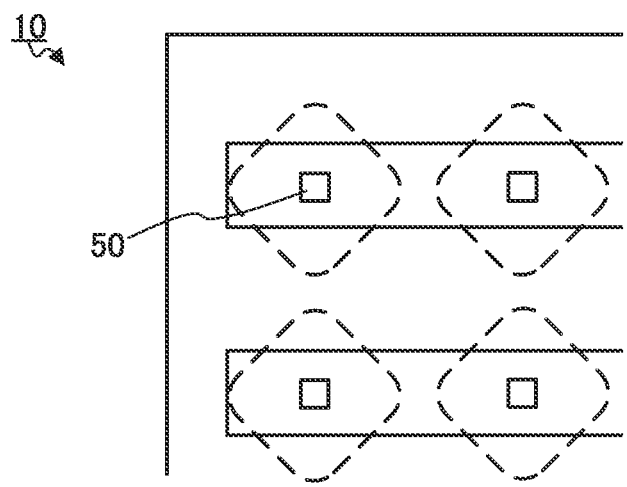
FIG. 7A illustrates an image of a luminance distribution of a light-emitting surface of a light-emitting element in a known surface light source device.
Figure 7B:
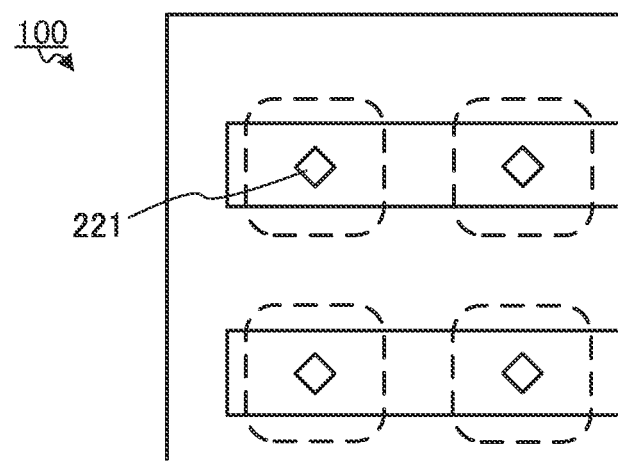
FIGS. 7B and 7C illustrate images of a luminance distribution of the light-emitting surface of the light-emitting element of the surface light source device according to the embodiment of the present invention.
Figure 7C:
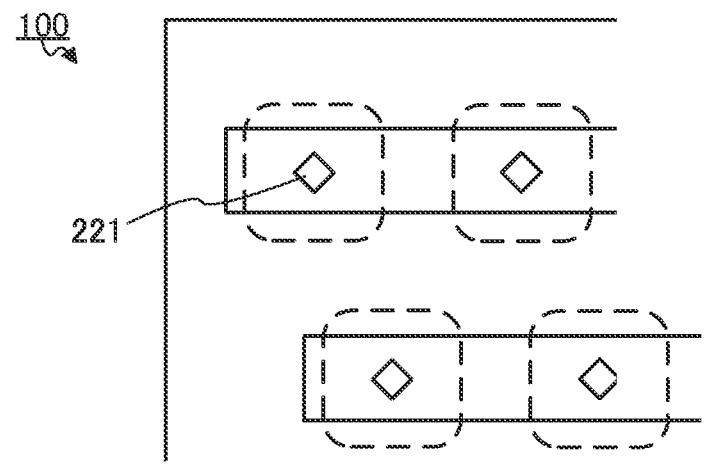

FIG. 7A illustrates an image of a luminance distribution on a light diffusion plate in known surface light source device 10, and FIG. 7B illustrates an image of a luminance distribution on a light diffusion plate in surface light source device 100 according to the present embodiment. FIG. 7C illustrates an image of a luminance distribution on a light diffusion plate in a surface light source device according to another embodiment of the present invention. As illustrated in FIG. 7A, in known surface light source device 10, it is difficult to deliver the light in the direction of the diagonal line of the quadrangle, and a dark point is generated in the region surrounded by the four light-emitting devices, and consequently, luminance unevenness tends to be generated. In contrast, as illustrated in FIGS. 7B and 7C, in surface light source device 100 according to the present embodiment, it is easy to deliver the light in the direction of the diagonal line of the quadrangle, and the generation of a dark point in the region surrounded by four light-emitting devices 200 is suppressed, and thus, the generation of luminance unevenness is suppressed.

Effect

As described above, in surface light source device 100 according to the present embodiment, each side of flight-emitting surface 221 of the light-emitting element is disposed obliquely to the longitudinal direction of substrate 210, and thus the generation of luminance unevenness can be suppressed in comparison with known surface light source device 10.

INDUSTRIAL APPLICABILITY

The surface light source device of the embodiment of the present invention is applicable to a backlight of a liquid crystal display apparatus, a generally-used illumination apparatuses, and the like, for example.

REFERENCE SIGNS LIST

10, 100 Surface light source device
20, 200 Light-emitting device
21, 210 Substrate
30, 300 Light flux controlling member
38, 380 Leg part
40 Supporting body
50, 221 Light-emitting element light-emitting surface
60 Dark point
100' Display device
102 Display member
110 Housing
112 Bottom plate
114 Top plate
120 Light diffusion plate
201 First virtual line
202 Second virtual line
220 Light-emitting element
350 Rear surface
CA Central axis
LA Optical axis

What is claimed is:

1. A surface light source device, comprising:
a housing;
one or more substrates disposed in the housing, each of the one or more substrates having a substantially rectangular shape;
a plurality of light-emitting devices disposed on the one or more substrates; and
a light diffusion plate disposed over the plurality of light-emitting devices,
wherein each of the plurality of light-emitting devices includes a light-emitting element and a light flux controlling member,
wherein the plurality of light-emitting devices is disposed on two or more first virtual lines that are parallel to each other and are parallel to one side of each of the one or more substrates,
wherein a light-emitting surface of the light-emitting element has a substantially rectangular shape in plan view, and
wherein of angles between a line along each side of the light-emitting surface of the light-emitting element and each of the two or more first virtual lines, a smallest angle is 25 degrees to 45 degrees.

2. The surface light source device according to claim 1, wherein the light flux controlling member includes four leg parts disposed opposite to respective four sides of the light-emitting surface.

3. The surface light source device according to claim 1, wherein the light-emitting surface has a substantially square shape.

4. A display device, comprising:
the surface light source device according to claim 1, and
a display member configured to be irradiated with light emitted from the surface light source device.

5. A surface light source device, comprising:
a housing;
one or more substrates disposed in the housing;
a plurality of light-emitting devices disposed on the one or more substrates; and
a light diffusion plate disposed over the plurality of light-emitting devices,
wherein each of the plurality of light-emitting devices includes a light-emitting element and a light flux controlling member,
wherein each of the plurality of light-emitting devices is disposed on each of the one or more substrates at a location on an intersection of a quadrangle defined by two or more first virtual lines that are parallel to each other and are set in the housing and two or more second virtual lines that are parallel to each other and intersect each of the two or more first virtual lines,
wherein a light-emitting surface of the light-emitting element has a substantially rectangular shape in plan view, and
wherein an angle between a line along each side of the light-emitting surface and a diagonal line of the quadrangle is 70 degrees to 110 degrees, or an angle between a line along a side of the light-emitting surface facing a direction of the diagonal and each of the two or more first virtual lines is 25 degrees to 65 degrees.

6. The surface light source device according to claim 5, wherein the light flux controlling member includes four leg parts disposed opposite to respective four sides of the light-emitting surface.

7. The surface light source device according to claim 5, wherein the light-emitting surface has a substantially square shape.

8. A display device, comprising:
the surface light source device according to claim 5, and
a display member configured to be irradiated with light emitted from the surface light source device.

* * * * *